United States Patent [19]
Bittinger

[11] Patent Number: 5,738,228
[45] Date of Patent: Apr. 14, 1998

[54] OBJECT HOLDER

[76] Inventor: Andrew H. Bittinger, W1515 Pine Rd., Eleva, Wis. 54738

[21] Appl. No.: 653,420

[22] Filed: May 24, 1996

[51] Int. Cl.⁶ .................................................. A47F 5/00
[52] U.S. Cl. ........................... 211/69.1; 211/60.1; 211/89
[58] Field of Search ...................... 211/89, 60.1, 69.1, 211/69.5, 65; 248/176, 309.1, 314

[56] References Cited

U.S. PATENT DOCUMENTS

| | | | |
|---|---|---|---|
| D. 251,124 | 2/1979 | Takeuchi | D19/65 |
| 357,351 | 2/1887 | Welliver | |
| 374,131 | 11/1887 | Roscoe | |
| 501,714 | 7/1893 | Gurney | |
| 674,916 | 5/1901 | Graham | |
| 734,984 | 7/1903 | Spillane | |
| 794,065 | 7/1905 | Woodworth | |
| 1,314,625 | 9/1919 | Wedin | 211/89 |
| 2,121,307 | 6/1938 | Swift | 211/89 X |
| 2,956,687 | 10/1960 | Robichaud | 211/65 X |
| 3,365,761 | 1/1968 | Kalvig | 24/257 |
| 4,189,048 | 2/1980 | Gaillard | 106/37 |
| 4,265,362 | 5/1981 | Suonvieri | 211/69.1 X |
| 4,573,569 | 3/1986 | Parker | 206/1.7 |
| 4,597,496 | 7/1986 | Kaplan | 211/70.6 |
| 4,773,545 | 9/1988 | Jones | 211/89 |
| 4,995,509 | 2/1991 | Kornfeind | 211/65 X |
| 5,005,710 | 4/1991 | Hofer | 211/70.6 |
| 5,072,904 | 12/1991 | Taylor | 248/110 |
| 5,381,922 | 1/1995 | Gladman et al. | 220/481 |
| 5,392,906 | 2/1995 | Taniyama | 206/311 |
| 5,396,987 | 3/1995 | Temple et al. | 206/309 |
| 5,407,073 | 4/1995 | Uchida | 206/308.3 |
| 5,601,194 | 2/1997 | Brinston | 248/314 X |

FOREIGN PATENT DOCUMENTS

2912444   10/1979   Germany ................... 211/66

*Primary Examiner*—Robert W. Gibson, Jr.
*Attorney, Agent, or Firm*—Robert Platt Bell and Associates, P.C.

[57] ABSTRACT

An attractive and portable object holder which can grip, hold, and contain objects, e.g., pens, pencils, tools, and artists' paint brushes, and the like, is disclosed. The rectilinear holder, along with its interior gripping bristles, is injection molded with polyethylene, polypropylene, or other similarly resilient plastic in a single mold. The flexible bristles act to grip and hold objects that are inserted between the bristles. The bristle qualities are chosen to be resilient and flexible to repeatedly grip, hold, and contain quantities of inserted objects without the bulky design or the ineffective grip-and-hold associated with the prior-art devices.

8 Claims, 6 Drawing Sheets

OBJECT HOLDER

FIELD OF THE INVENTION

The present invention relates to an object holder to grip objects like pens, pencils, tools, artists' paint brushes, and the like. The present invention has a particular use both as a free-standing object holder and as a mountable object holder.

BACKGROUND OF THE INVENTION

Prior art object holders were designed to hold specific objects. For example, U.S. Pat. No. 3,365,761, issued Jan. 30, 1968 to L. E. Kalvig, discloses a device for gripping a shaft-like member of larger household items like a broom. Kalvig's shaft holding device utilizes a flexible circular sheet with radial slits and having a doughnut-like hole sized to accommodate and provide adequate gripping pressure to a shaft-like member inserted for storage and holding. Its primary disadvantages spring from its gripping design limitations: The device must be vertically mounted, mainly for hanging of articles under gravity; an article it holds must have a shaft within a certain range of diameters; and there is insufficient containment to effectively counter undesirable tilting or swaying motions of a held article.

U.S. Pat. No. 4,597,496, issued Jul. 1, 1986 to S. E. Kaplan, is a similar elongated-tool holder. It uses a ring of flexible finger arrays to provide the gripping hold. The housing is a continuous extrusion of polyvinylchloride (PVC) with finger-array mounting channels, top flanges to guide placement of bottom-inserted tools, and an adjustment knob to adjust the gripping pressure of the finger arrays. Although Kaplan has the advantage of being selectively adjustable for hanging heavy or small objects having varying sizes and diameters, it is nevertheless relatively large, bulky, and not attractive as a portable small-items holder.

U.S. Pat. No. 4,773,545, issued Sep. 27, 1988 to G. R. Jones exemplifies a different nature of gripping device. Its housing may be extruded with a rigid plastic (PVC) or aluminum. The housing and its flexible gripping flap are both elongated to grip thin or wide items, (e.g., paper, card, plastics, cloth, and the like.) An outer surface has a double sided adhesive strip or pad to adhere the paper-gripping device to a support surface. However, because of the nature of its gripping design, it is impractical and unattractive to effectively grip and hold quantities of pens, pencils, tools, artists' paint brushes, and the like. It is also not appealing to use as a portable small-items holder.

Heretofore, these prior-art gripping devices were either incapable of holding items of elongated shapes, or their utility for such endeavors was impractical due to their bulky construction and their nature of design.

Figure 9:
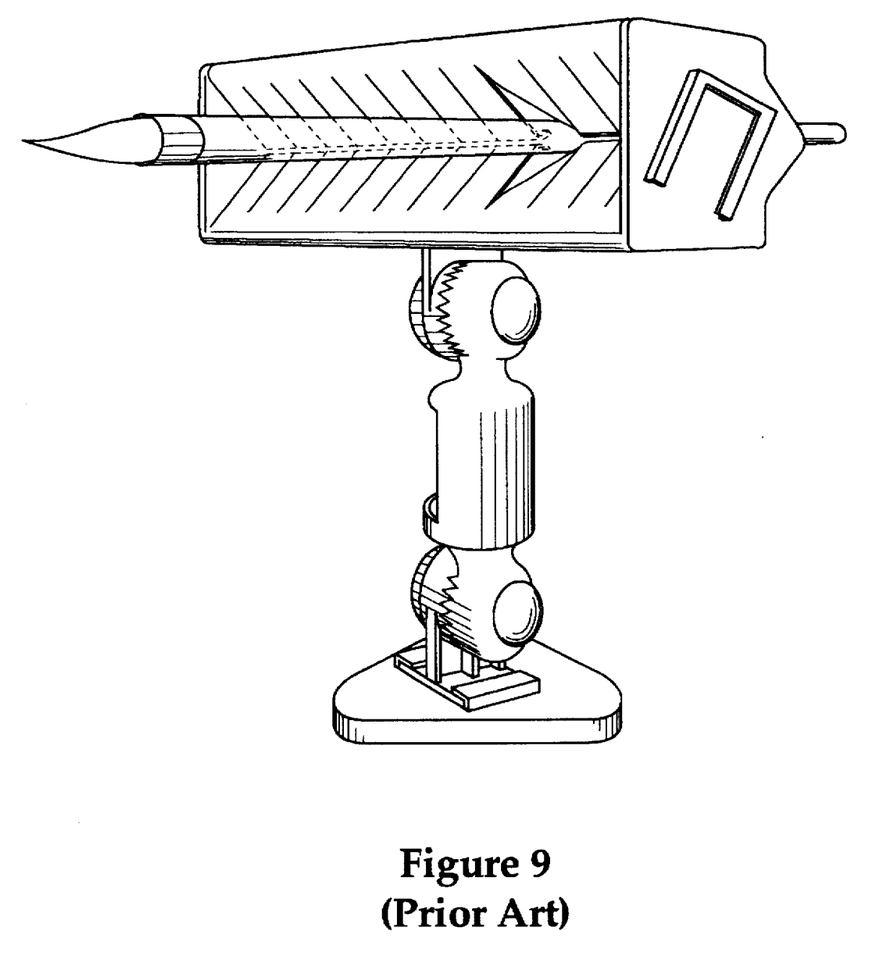
FIG. 9 is a perspective view of a prior-art brush holder.

U.S. Pat. No. 5,072,904, issued Dec. 17, 1991 to K. D. Taylor exemplifies a modern object holder which holds artists' brushes and the like. Two pairs of opposed rows of flexible reeds, which are rows of flexible tabs created from parallel slits on oppositely placed flexible sheets, are flexed by an inserted brush in between, thereby causing the flexed reeds to support the inserted end of a brush. As demonstratively illustrated in FIG. 9, its prior-art design permits the brushes to be stored in generally a horizontally tilted angle to prevent undesired draining of wet paint onto the brush handles. However, there are disadvantages to this prior-art holder. The nature of its gripping design requires that wide tabs be flexed to secure elongated items. Repeated flexing of those wide tabs by abrasive insertions of a brush object causes wear and tear, both on the tabs and on the elongated object being inserted. The tabs may eventually weaken or break, and fine surfaces of the objects being held may become scratched and damaged from repeated insertions. Furthermore, due to the connected nature of the reed members, the ability to grip and hold becomes pronouncedly impeded when adjacent reeds are simultaneously flexed by two adjacently inserted objects. In an extreme case, once a larger object is inserted and secured, an effort to insert and secure a small object adjacent to the larger object would fail because of a yawning of connected reed members.

What is then required is a practical and attractive object holder that effectively grips and holds quantities of pens, pencils, tools, artists' paint brushes, and the like. It must operate flexibly and repeatedly without a surface damage or undue stress. It must also be simple, yet versatile and appealing enough to use as alternatively a tilting, mountable, or portable object holder.

SUMMARY AND OBJECTS OF THE INVENTION

The present invention contemplates a new and improved object holder to more effectively grip and hold pens, pencils, tools, artists' paint brushes, and the like, without the bulky design and certain grip-and-hold limitations and disadvantages associated with prior-art devices. The new object holder may be simple, lightweight, and may come in slim sizes to be easily portable. It may be adjustable angle mounted, mounted with a mounting tape, flush mounted on a working surface, clipped-on to a person's garment, or simply placed upright as an attractive object holder.

In accordance with a first aspect of the invention, there is provided an object holder simply designed to repeatedly and effectively grip, hold, and contain quantities of objects like pens, pencils, tools, artists' paint brushes, and the like without causing any weakening or damages associated with repeated or multiple object insertions. The top, or alternatively, the top and the bottom, may be open for access to its interior. The object holder may be comprised of a single injection-molded polyethylene, polypropylene, or other similarly resilient plastic. The single injection mold may have incorporated in its mold two sets of plastic bristles, each set being referred to as a bristle half. The two bristle halves may flexibly snap together into a single object holder. The gripping hold of an inserted object may be provided by the opposing bristle halves provided within the object holder.

In accordance with a second aspect of the invention, there is provided a slim, elongated object holder designed to grip, hold, and contain objects like pens, pencils, tools, artists' paint brushes, and the like. The holder's standing height may be set to adequately accommodate insertions of pens, pencils, tools, artists' paint brushes, and the like. A thin, double-backed foam tape may be applied to a face of the holder to adhere the holder to various mounting surfaces, even surfaces that have minor surface irregularities.

In accordance with a third aspect of the invention, an adjustable angle mount is provided. The adjustable angle mount is a mounting stand pivotally attached to both sides of a holder so as to allow the holder to tilt with respect to the stationary mounting stand. Once a satisfactory frontal tilting angle is found with respect to the mounting stand, a friction knob is engaged to fix the tilting angle of the holder within a 90° pivoting limitation. Finally, the mounting stand itself may be fixedly attached to an arbitrary mounting surface for best placement.

In accordance with a fourth aspect of the invention, there is provided a slim, elongated object holder having all of the aforementioned characteristics for the first and second aspects of the invention. Further to those aforementioned characteristics, a spring clip that attaches to the basic holder unit is provided. The spring clip allows the holder to be temporarily attached to thin objects, e.g., a sun visor, waist belt, a desk shelf divider, any lip portion of an outer garment, and the like.

In accordance with a fifth aspect of the invention, there is provided a slim, elongated object holder having all of the aforementioned characteristics for the first and second aspects of the invention. Further to those aforementioned characteristics, a mounting flange is provided around the periphery of a brush-insert opening of the holder. The mounting flange allows the holder to be flush mounted on working surfaces, e.g., table tops, desk tops, cabinet walls or shelves, car dashboards, and the like.

It is an object of the present invention to provide a new and improved object holder with opposing bristle halves, all singularly plastic molded to more effectively and aesthetically grip and hold quantities of objects like pens, pencils, tools, artists' paint brushes, and the like.

It is a further object of the present invention to provide a simple and lightweight object holder that may come in slim sizes.

It is a further object of the present invention to provide an object holder that may be tilted, mounted, spring-clipped to a garment, or simply placed upright as an attractive object holder.

It is a further object of the present invention to achieve the above versatility by means of one or more components that may be simply attached, snapped, or assembled, thereby allowing a considerable flexibility of usage with one or more commonly manufactured components.

DETAILED DESCRIPTION OF THE INVENTION

Figure 7:
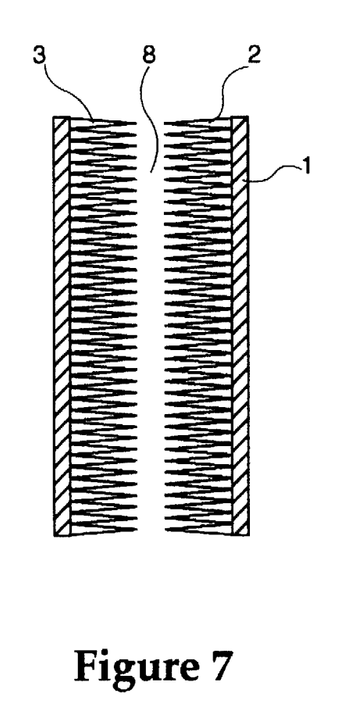
FIG. 7 is a cross-section view of the object holder showing the oppositely-facing bristle halves.
Figure 8:
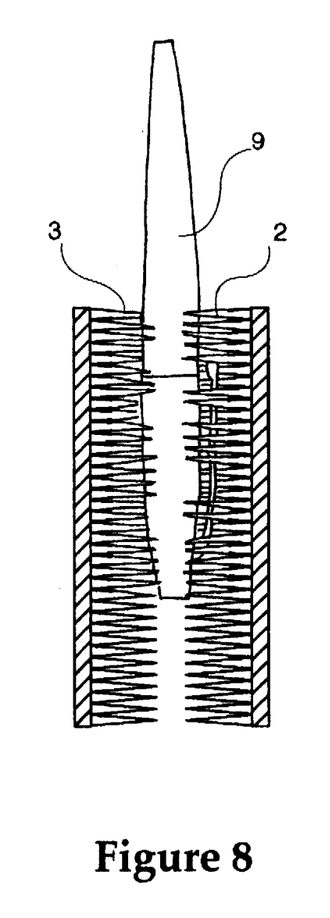
FIG. 8 is an exemplary cross-section view of the object holder gripping and holding an inserted object.

The best mode for the object holder is illustrated in FIG. 7. Two plastic bristle halves 2 and 3 are shown inside an object holder 1, the free ends of the bristle halves oppositely facing inward. An exemplary plastic bristle set may have bristles approximately ½ inch long and 0.025 inch thick, with varying widths, spacing, and density to provide an adequate grip-and-hold of an object inserted into the holder's cavity 8. FIG. 8 demonstratively shows an object 9 inserted in between the spaces of two opposing bristle halves 2 and 3 filling the holder's cavity. Object 9 is demonstratively shown parting the opposing bristle ends to accommodate the placement of an object 9 being inserted. Although object 9 is illustrated as a pen, it could be any pen, pencil, tool, artists' paint brush, or the like.

The plastic bristle halves 2 and 3 may vary considerably in their physical qualities. For proof-of-concept, soft, tapered, bristles found on a black, oval brush pad, which comes attached to the nozzle end of an 11 oz. can of Bissell Upholstery Shampoo™ was found to satisfactorily grip and hold objects when two such pads were placed with the free bristle ends approximately facing each other. The bristles are about ½" long, thin, tapered towards the free ends, 1/16" wide at the wider fixed ends, fixed in rows of 1/8" separation. Its composition may be a single-injection mold of polyethylene or polypropylene plastic.

Another fine bristle pad found to have satisfactory grip-and-hold characteristics is the E-Z Scrub™ 106, catalog number 371065, marketed as a sponge-brush for surgical hand with nail cleaner by Becton Dickinson Acutecare, which is a trade name. The E-Z Scrub™ 106 was found to satisfactorily grip and hold objects when two such pads were placed opposite to each other with the free bristles ends approximately placed facing each other. Although E-Z Scrub™ 106 is marketed with a scrub sponge glued to the pad, for the present purpose, the sponge portion may be detached and discarded, leaving only the fine bristle pad. The bristles are approximately 7/16" long, thin, tapered towards the free ends, 1/32" wide at the wider fixed ends, fixed in rows of 1/16" separation. Its composition is best judged to be a single-injection mold of polyethylene, polypropylene, or a similarly resilient plastic.

A coarse bristle pad found to have satisfactory grip-and-hold characteristics came from a plastic bristle matting material intended as a door mat. It is widely marketed as Astro Turf™, a trademark of South West Recreational Industries. Astro Turf™ is manufactured by Monsanto Company of St. Louis, Mo.

Astro Turf™ was found to satisfactorily grip and hold objects when two such sample pads were placed opposite to each other with the free bristle ends placed approximately facing each other. The bristles are approximately irregularly bent and stand ¾" tall, thin, uniformly 1/16" wide, and fixed in circular clusters of 7 bristles, each cluster being in rows of ½" separation. Its composition is best judged to be a single-injection mold of polyethylene. There are separable thin sheets of felt and plastic found glued on its backing, although these other extraneous compositions are not necessary for our testing purpose.

The best mode pertaining to the bristle halves do not need to be limited as heretofore disclosed. The bristle halves 2 and 3 may have opposing bristles uniformly arranged in a gradient of bristle qualities. For example, bristle lengths may be varied with respect to the insertion depth so that the hold on an object becomes firmer with increasingly deeper insertion of an object. In the alternative, the flexibility of bristles may be varied with respect to the insertion depth so that the hold on an object becomes firmer with increasingly deeper insertion of an object.

Figure 1:
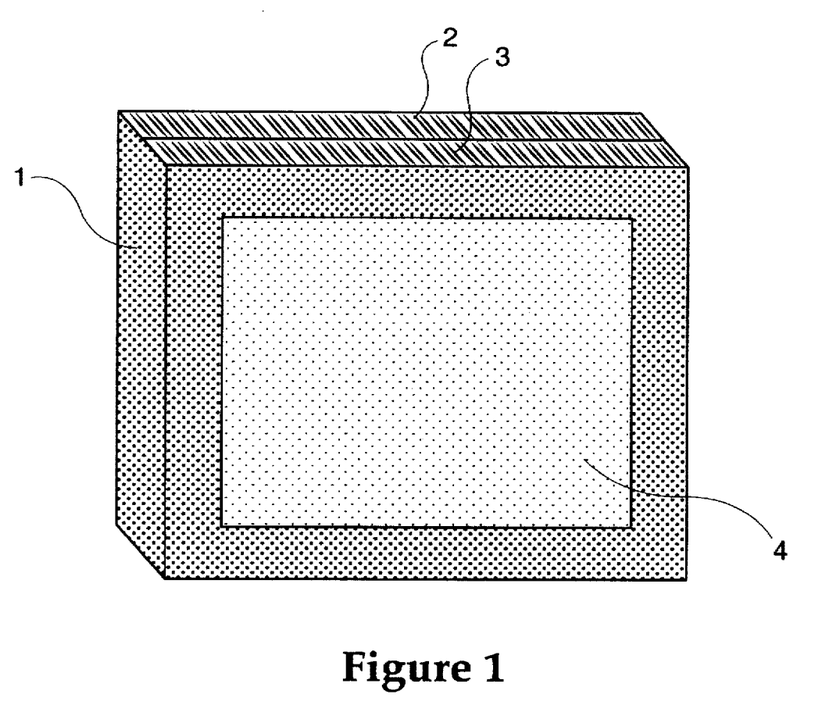
FIG. 1 is a perspective view of an exemplary 3.5 inch-long embodiment of the present object holder invention with a thin, double-backed foam tape shown on the front face of the embodiment.

As shown in FIG. 1, the first embodiment of the present invention is a slim, elongated object holder 1 designed to grip, hold, and contain objects like pens, pencils, tools, artists' paint brushes, and the like. The holder is single injection-molded with polyethylene, polypropylene, or other similarly resilient plastic. It may be rectangular in shape, with the top end, or in the alternative, the top and bottom ends, open to form an opening to a cavity 8 therein. Two oppositely facing bristle halves 2 and 3 are attached therein and fill the cavity 8.

As shown in FIG. 1, the outside dimensions may be about 3.5×2.75×1.125 inches in length-height-depth, subject to variances to accommodate the nature of the bristles used therein, aesthetics of container design, and inclusion of any functional points of attachments. The holder's height may be set at about 2.75 inches to adequately accommodate insertions of most pens, pencils, tools, artists' paint brushes, and the like.

FIG. 1 is also shown with a thin, double-backed foam tape 4 applied to the front face. A thin, double-backed foam tape 4 is applied to a face of the holder to adhere the holder to various mounting surfaces. A thin, double-backed foam tape 4 will allow the holder to be attached to objects that may have minor surface irregularities. Other embodiments described herein may also utilize a thin, double-backed foam tape 4 in a like manner. Moreover, a plurality of holders may be attached with a thin, double-backed foam tape 4 to provide larger overall holding dimensions for a greater holding capacity.

Figure 2:
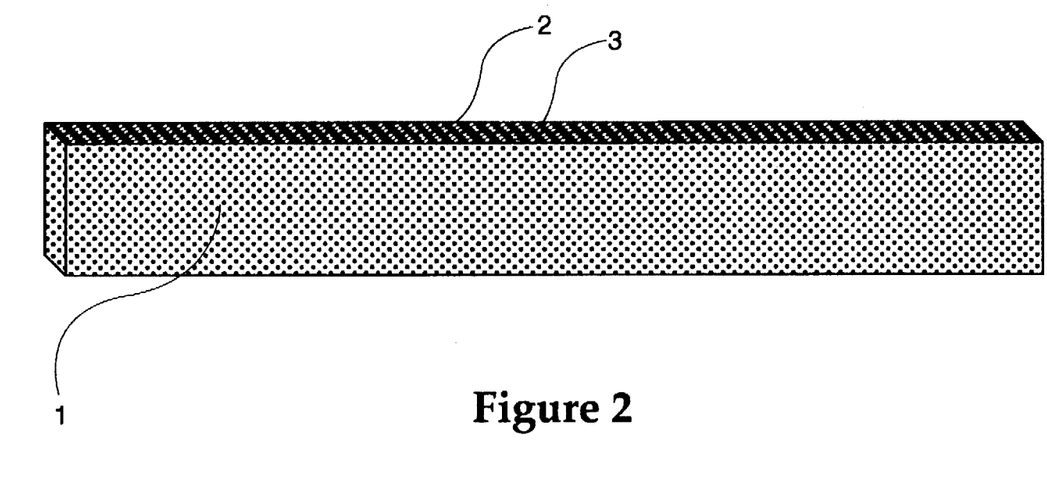
FIG. 2 is a perspective view of an exemplary 8.5 inch-long embodiment of the present object-holder invention.

In FIG. 2 is the second embodiment of the basic object-holder unit is shown as a longer, elongated version, having the outer dimensions of about 8½×2.75×1.125 inches, subject to variances to accommodate the nature of the bristles used therein, aesthetics of container design, and inclusion of any functional points of attachment. The holder's height may be set at about 2.75 inches to adequately accommodate insertions of most pens, pencils, tools, artists' paint brushes, and the like.

Figure 3:
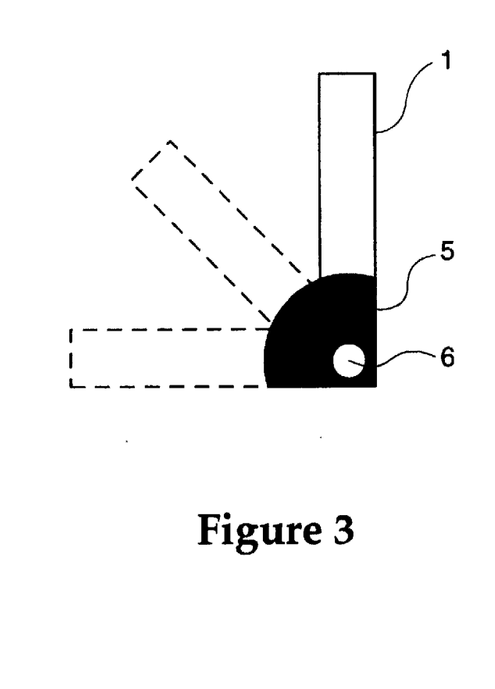
FIG. 3 is a side view of the angle-mount embodiment of the present object-holder invention to allow adjusting of the pivoting angle of the basic holder unit.

In FIG. 3, the third embodiment of the object-holder invention, there may be provided a slim, elongated object holder 1 having all of the aforementioned characteristics for either the first or the second embodiment of the invention. Further to those aforementioned characteristics, an adjustable angle mount 5 may be provided. An adjustable angle mount 5 may serve as an adjustable mounting stand for a holder 1. It may be pivotally attached to both sides of a holder 1 to allow frontal tilting of the holder 1 with respect to the adjustable angle mount 5. A friction knob 6 may be secured to one or both sides of an adjustable angle mount 5 so as to fix the holder 1, secured onto the adjustable angle mount 5, at any of the 90° front-tilting angles around a common pivoting axis by friction tightening of one or more friction knobs 6.

Figure 4:
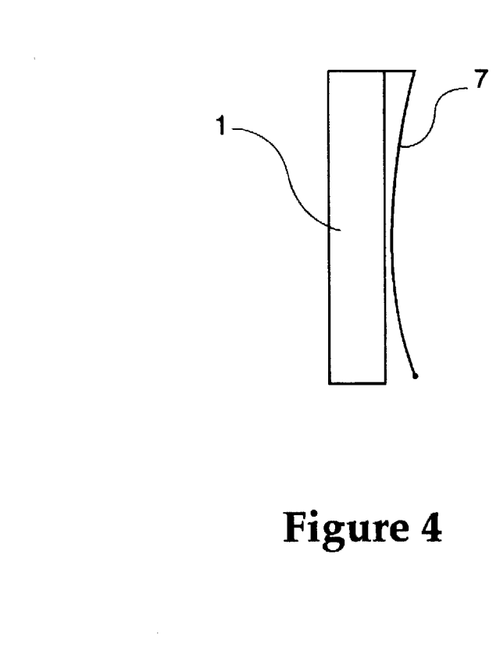
FIG. 4 is a side view of the spring-clip embodiment of the present object-holder invention.

In FIG. 4, the fourth embodiment of the object-holder invention, there may be provided a slim, elongated object holder 1 having all of the aforementioned characteristics for either the first or the second embodiment of the invention. Further to those aforementioned characteristics, a spring clip 7 that attaches to the basic holder unit may be provided. A spring clip 7 may allow a holder 1 to be temporarily attached to thin objects, e.g., a sun visor, waist belt, a desk shelf divider, any lip portion of an outer garment, and the like.

Figure 5:
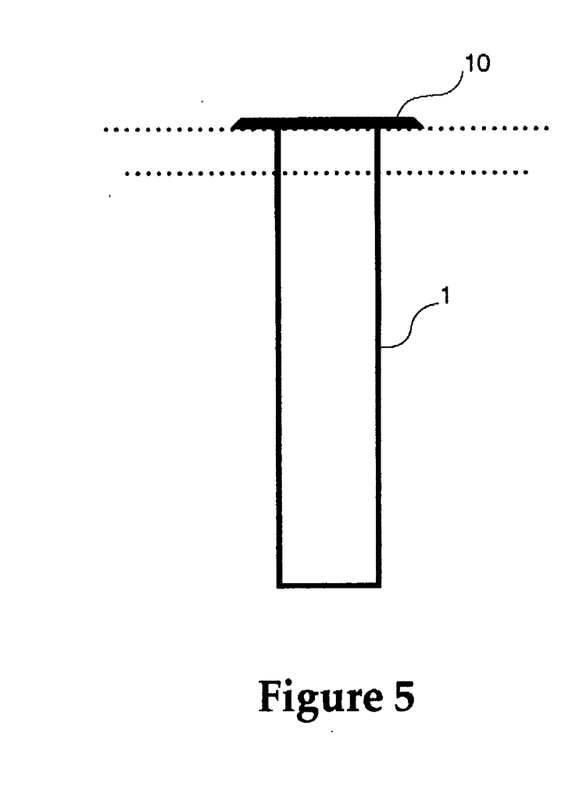
FIG. 5 is a side view of the mounting-flange embodiment of the present object-holder invention to allow flush mounting of the object holder through an insert slot on a working surface.
Figure 6:
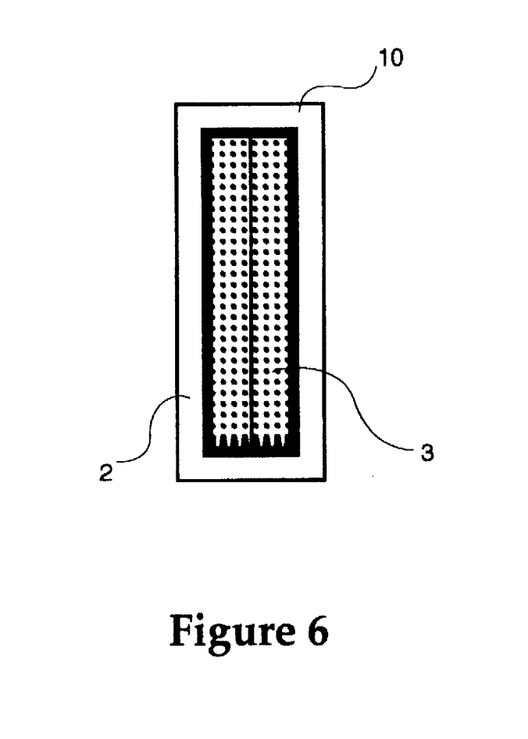
FIG. 6 is a top view of the mounting-flange embodiment of the present object-holder invention.

As shown in FIGS. 5 and 6, the fifth embodiment of the object-holder invention, there may be provided a slim, elongated object holder 1 having all of the aforementioned characteristics for either the first or the second embodiment of the invention. Further to those aforementioned characteristics, a mounting flange 10 is provided around the outer periphery of a brush-insert opening. The mounting flange 10, which is a uniformly extruding outer extension around the periphery of a brush-insert opening, allows the holder to be flush mounted upon insertion of the holder 1 through an approximately matching-sized face opening of a working surface. The mounting flange acts as a stop for flush mounting of the object holder 1. The candidate mounting surfaces may vary considerably, e.g., table tops, desk tops, cabinet walls or shelves, car dashboards, and the like.

In the described manner a holder i is able to easily and repeatedly grip, hold, and contain quantities of objects, e.g., pens, pencils, tools, artists' paint brushes, and the like, being inserted through an open end.

While various alternative embodiments of the invention have been disclosed and described in detail herein, it may be apparent to those skilled in the art that various changes in form and detail may be made therein without departing from the spirit and scope thereof. The dimensions, shapes, and sizes pertaining to the object holder are not necessarily limited by the present disclosure. Considerable variances may be encompassed by the present disclosure to incorporate certain ordinary considerations of aesthetics, practicality, mold design, and manufacture. For example, in addition to varying the flexible qualities and/or the lengths of the bristles in relation to the insertion depth, the object holder dimensions may be tapered in relation to the insertion depth to gain further grip-and-hold advantages with respect to the specific qualities and quantities of the objects contemplated for insertion.

What is claimed is:

1. A device for holding articles, comprising:

a rigid rectilinear housing with one or more openings to receive articles; and a plurality of flexible bristles formed on at least one inside surface of said rectilinear housing for gripping and holding articles inserted into said one or more openings of said rigid rectilinear housing, wherein said rigid rectilinear housing and said plurality of flexible bristles formed thereon are injection molded in a single mold.

2. A device for holding articles comprising:

a rigid rectilinear housing with one or more openings to contain articles that are inserted; and a plurality of flexible bristles attached therein as two bristle halves with free bristle ends placed approximately opposite to respectively other free bristle ends for gripping and holding articles inserted into said one or more openings of said rigid rectilinear housing, and in between said approximately oppositely placed free bristle ends, wherein said rigid rectilinear housing and said two bristle halves attached therein are injection molded with polyethylene or polypropylene in a single mold.

3. A device for holding articles comprising:

a rigid rectilinear housing with one or more openings to contain articles that are inserted; and a plurality of flexible bristles attached therein as two bristle halves with free bristle ends placed approximately opposite to respectively other free bristle ends for gripping and holding articles inserted into said one or more openings of said rigid rectilinear housing, and in between said approximately oppositely placed free bristle ends;

wherein said rigid rectilinear housing has one or more of its outside dimensions tapered such that the free ends of said two bristle halves are successively placed closer together along the direction of the taper to provide an increasing holding strength as the article is inserted further into said one or more openings.

4. A device for holding articles comprising:

a rigid rectilinear housing with one or more openings to contain articles that are inserted; and a plurality of flexible bristles attached therein as two bristle halves with free bristle ends placed approximately opposite to respectively other free bristle ends for gripping and holding articles inserted into said one or more openings of said rigid rectilinear housing, and in between said approximately oppositely placed free bristle ends;

wherein said bristles have increasingly graduated lengths along a direction of insertion from one of said one or more openings so as to provide increasing holding strength as the article is inserted further into said one or more openings.

5. A device for holding articles comprising:

a rigid rectilinear housing with one or more openings to contain articles that are inserted;

a plurality of flexible bristles attached therein as two bristle halves with free bristle ends placed approximately opposite to respectively other free bristle ends for gripping and holding articles inserted into said one or more openings of said rigid rectilinear housing, and in between said approximately oppositely placed free bristle ends;

wherein said bristles have increasingly graduated flexibility along a direction of insertion from one of said one or more openings so as to provide increasing holding strength as the article is inserted further into said one or more openings.

6. A device for holding articles comprising:

a rigid rectilinear housing with one or more openings to contain articles that are inserted;

a plurality of flexible bristles attached therein as two bristle halves with free bristle ends placed approximately opposite to respectively other free bristle ends for gripping and holding articles inserted into said one or more openings of said rigid rectilinear housing, and in between said approximately oppositely placed free bristle ends; and an adjustable angle mount with one or more friction knob(s) used for pivotally attaching to, friction-holding, and standing said rigid rectilinear housing at any frontal tilting angle.

7. A device for holding articles comprising:

a rigid rectilinear housing with one or more openings to contain articles that are inserted;

a plurality of flexible bristles attached therein as two bristle halves with free bristle ends placed approximately opposite to respectively other free bristle ends for gripping and holding articles inserted into said one or more openings of said rigid rectilinear housing, and in between said approximately oppositely placed free bristle ends; and a spring clip provided to optionally attach to said holder and also to clip on to thin objects like a sun visor, a waist belt, a desk shelf divider, and any lip of a clothing garment.

8. A device for holding articles comprising:

a rigid rectilinear housing with one or more openings to contain articles that are inserted;

a plurality of flexible bristles attached therein as two bristle halves with free bristle ends placed approximately opposite to respectively other free bristle ends for gripping and holding articles inserted into said one or more openings of said rigid rectilinear housing, and in between said approximately oppositely placed free bristle ends; and a mounting flange around an outer periphery of one or more openings of the rigid rectilinear housing, which mounting flange is a uniformly extruding outer extension around an outer periphery of one or more openings of the rigid rectilinear housing, to act as a stop for flush mounting of said device upon insertion of said device through an approximately matching-sized face opening of a working surface.

* * * * *